United States Patent
Sarma et al.

(10) Patent No.: US 6,311,100 B1
(45) Date of Patent: Oct. 30, 2001

(54) TOOL PATH GENERATOR FOR COMPUTER AIDED MANUFACTURING

(75) Inventors: Sanjay E. Sarma, Belmont; Putta Laxmiprasad; Mahadevan Balasubramaniam, both of Cambridge, all of MA (US)

(73) Assignee: Mass. Institute of Technology, Cambridge, MA (US)

( * ) Notice: Subject to any disclaimer, the term of this patent is extended or adjusted under 35 U.S.C. 154(b) by 0 days.

(21) Appl. No.: 09/152,556

(22) Filed: Sep. 14, 1998

(51) Int. Cl.[7] .................................................. G06F 19/00
(52) U.S. Cl. ........................................... 700/190; 700/186
(58) Field of Search .................................... 700/160, 186, 700/187, 178, 190, 191

(56) References Cited

U.S. PATENT DOCUMENTS

| | | | |
|---|---|---|---|
| 4,513,366 | * 4/1985 | Munekata et al. | 700/178 |
| 4,704,687 | * 11/1987 | Kishi et al. | 700/190 |
| 4,758,961 | * 7/1988 | Uemura et al. | 700/160 |
| 4,791,576 | * 12/1988 | Tanaka et al. | 700/187 |
| 4,837,703 | * 6/1989 | Kakazu et al. | 700/176 |
| 4,851,986 | * 7/1989 | Seki et al. | 700/86 |
| 4,926,338 | * 5/1990 | Nankaku | 700/190 |
| 4,945,487 | * 7/1990 | Kimura et al. | 700/160 |
| 4,998,196 | * 3/1991 | Seki et al. | 700/86 |
| 5,008,806 | * 4/1991 | Seki et al. | 700/86 |
| 5,070,464 | * 12/1991 | Seki et al. | 700/192 |
| 5,107,436 | * 4/1992 | Levine et al. | 700/186 |
| 5,122,966 | * 6/1992 | Jansen et al. | 700/178 |
| 5,159,559 | * 10/1992 | Alain | 700/186 |
| 5,175,689 | * 12/1992 | Matsushita et al. | 700/187 |
| 5,247,451 | * 9/1993 | Sawamura et al. | 700/178 |
| 5,305,228 | * 4/1994 | Seki et al. | 700/187 |
| 5,363,308 | * 11/1994 | Guyder | 700/187 |
| 5,391,024 | * 2/1995 | Levine et al. | 409/84 |

* cited by examiner

Primary Examiner—William Grant
Assistant Examiner—Edward F Gain, Jr.
(74) Attorney, Agent, or Firm—Wolf, Greenfield & Sacks, P.C.

(57) ABSTRACT

A technique is provided for utilizing a computer system to generate tool paths for the computed aided machining (CAM) in at least four axis of a selected workpiece or part, particularly a complex part having hidden surfaces. The technique involves storing in the computer system both a surface point representation of a workpiece, which representation contains a unique code for each surface point, and a representation of the tool for which the paths are to be generated. The workpiece surface is viewed from a discrete number of orientations and a map of surface points visible from each of the orientations is generated. The map is then used to obtain selected most promising access directions for access to voxels in the delta volume to be removed or for access to surface points for a finishing operation. Such most promising access directions may for example be obtained by thinning an access cone for the voxel/point. Collision detection is then performed for the tool along each of the most promising access directions and the directions adjusted to eliminate collisions, resulting in a legal direction for each voxel/point. The legal directions are then connected into the tool paths, with collision detection preferably being performed on the tool paths and the tool paths adjusted to avoid detected collisions. Tool paths may be individually generated for successive slices of the delta volume. The tool paths generated may be stored on a machine readable medium.

27 Claims, 8 Drawing Sheets

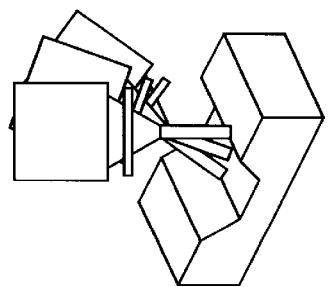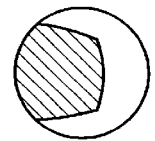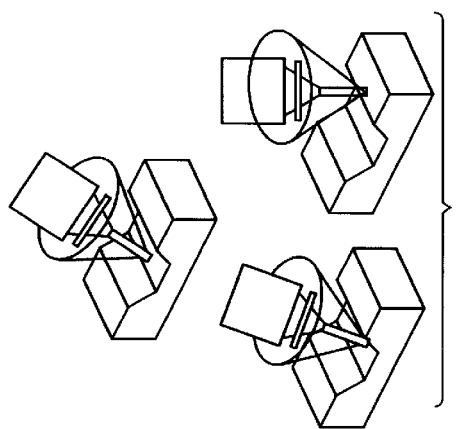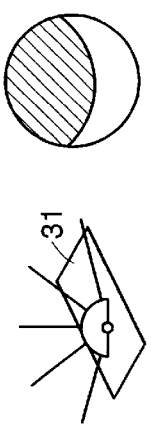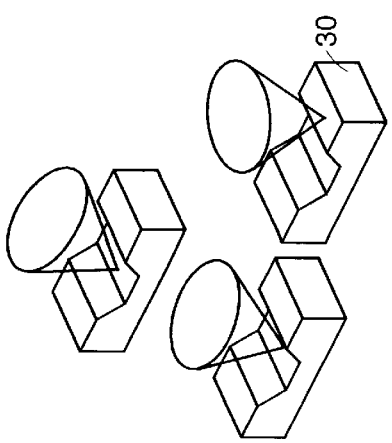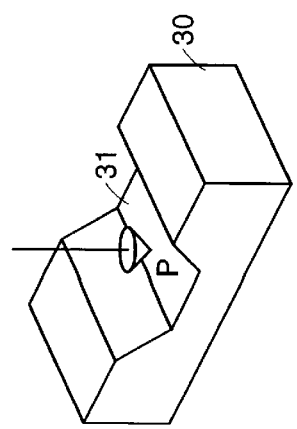

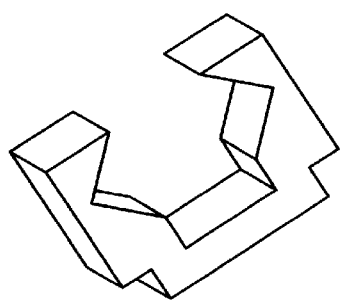
FIG. 12a
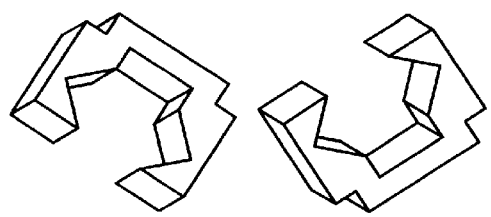
FIG. 12b
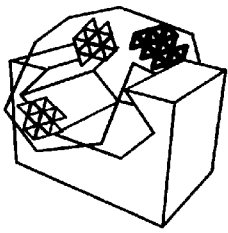
FIG. 12c
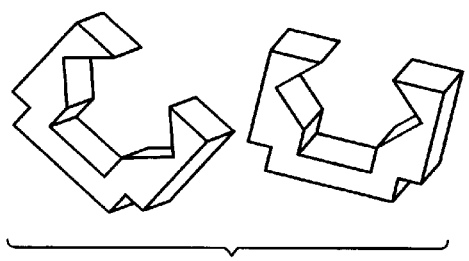
FIG. 12d
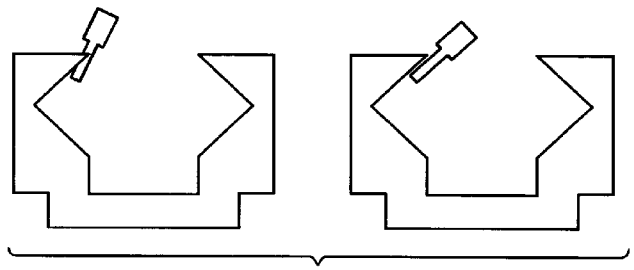
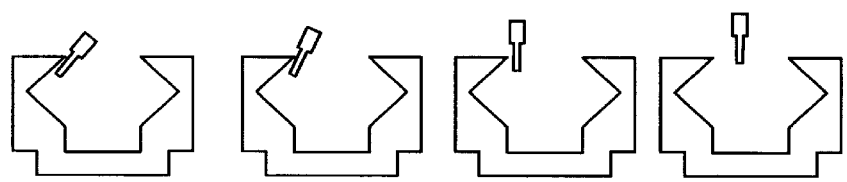
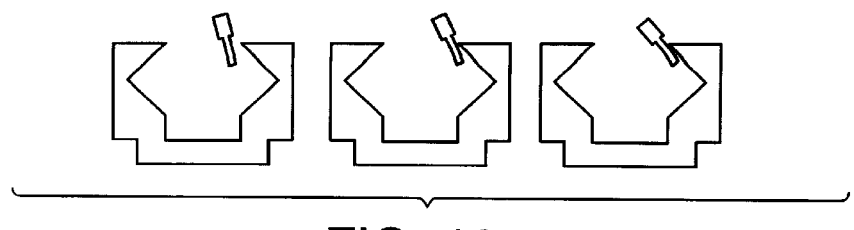
FIG. 12e

TOOL PATH GENERATOR FOR COMPUTER AIDED MANUFACTURING

This invention was made with government support under Grant No. N00014-95-1-G039 awarded by the Department of the Navy. The government has certain rights in the invention.

FIELD OF THE INVENTION

This invention relates to computer aided manufacturing (CAM) and more particularly to the automated generation of tool paths for CAM applications.

BACKGROUND OF THE INVENTION

Machining is used extensively for producing prototypes, partially completed or roughed parts and finished parts in laboratory, industry, and other environments. However, since it takes considerable intelligence and manual skill to both plan and operate tools like milling machines and lathes to perform machining operations, particularly for complex parts, automatic machining involving computer aided manufacturing (CAM) has become increasingly popular over the years.

Current CAM systems require as inputs shape primitives, defined in terms of access directions and parametrized cutting paths, and generate low level cutting instructions from such inputs. Such systems work reasonably well for three-axis machining such as end milling, face milling and drilling, but cannot efficiently capture the tool paths required for machining in four or more axis. Further, these techniques do not make tool paths for machining various features directly available from the received inputs, and these paths must be extracted with manual input from the user. Thus, for these systems, the onus of feature extraction is on the manufacturing engineer, making the processes time consuming and expensive. The resulting output may also frequently require considerable operator skill, something which is difficult to come by. This results in the laying out of a CAM job representing a significant fraction of the total cost of the entire project.

One problem when laying out tool paths, particularly for workpieces or parts having hidden surfaces, is to assure that contact by the workpiece with the tool is only at the tool's cutting/working surface and that spurious collisions do not occur between the workpiece and other parts of the tool, which collisions could interfere with tool operation and could result in defects in the resulting parts, rendering them unusable. Existing systems do not guarantee that the tool paths generated will be collision free and the onus of avoiding collisions between the tool and workpiece again falls on the manufacturing engineer and/or system operator. Difficulties in performing collision avoidance is a significant reason for the high cost in laying out complex CAM jobs.

A need therefore exist for an improved methodology for providing tool paths, particularly for complex parts or workpieces having at least partially hidden surfaces, and particularly where the CAM systems has four or more axis which may be utilized to facilitate access to such complex workpieces. Such a methodology should permit collision free tool paths to be automatically and rapidly generated, without requiring substantial time and effort on the part of the manufacturing engineer or other person laying out the job, and without requiring significant skill on the part of the machine operator. Such methodology would thus significantly speed the process of laying out CAM projects, facilitating the use of CAM for generating laboratory prototypes and the like, and would also significantly reduce the skill level of personnel required both to lay out jobs and to operate CAM machines. It would also result in more optimal paths for such systems, would significantly reduce the total cost involved in a CAM project, particularly ones involving short runs of parts, and would significantly reduce the time required to set up a CAM project, permitting users to more rapidly respond to parts requirements from customers and others.

SUMMARY OF THE INVENTION

In accordance with the above, this invention provides a method for utilizing a computer system to generate tool paths for computer aided machining in at least four-axis of a selected workpiece or part from a stock, which method includes the steps of (a) storing in the computer system both a surface point representation of the workpiece, which representation contains a unique code for each of the surface points, and a representation of a tool for which paths are to be generated; (b) viewing the workpiece surface from a discrete number of orientations and generating a map of surface points visible from each such discrete orientations; (c) utilizing said map to obtain selected most promising access directions; (d) performing collision detection for the tool along each of the most promising access directions for each most promising access direction; and (e) connecting the legal directions into tool paths. The method may also include the steps, performed either during or after step (e), of performing collision detection on the tool paths and adjusting the tool paths to avoid detected collisions. Step (e), the connection of legal directions into tool paths, may be performed by interpolating both between legal directions and the orientations of the legal directions for the successive points. The generation of the tool paths thus involves two levels of interpolation.

The surface segmented representation of the workpiece may be a tesselated representation, with each point being a triangular segment, and the tool may be represented as a series of triangulated slabs. Collision detection may be performed by positioning the tool at a most promising access direction previously determined, performing collision detection between the tool and the workpiece for each such access direction, computing a correction if a collision is detected and rotating the tool by the correction angle. The performance of collision detection may be repeated, with the collisions corrected in each instance, until either a collision is not detected during collision detection or a selected number of iterations of collision detection and correction have been performed. The tool may alternatively be represented as an implicit equation, and the representation of the tool used during collision detection may be wider than the tool, at least in the nonworking or in active areas thereof. Further, the code assigned to each segment on the workpiece surface may be a color code, with the map generated of visible surface points being a color map.

Step (c) may include forming a visibility "cone" for each segment to be operated on by the tool, the segments being voxels for a roughing operation and surface points (triangles for preferred embodiments) for a finishing operation. The visibility cones can be utilized to determine the most promising access direction. For preferred embodiments, this is accomplished by selectively thinning the visibility cone. Where there are angular limits on at least one of the axis, the thinning step is restricted so that each most promising access direction is within the angular limits of such axis. For a preferred embodiment, the selective thinning is performed by removing outer visibility paths of the visibility cone.

Step (c) may also include the generation of a voxel visibility map for each surface point which includes voxels in a delta volume of the stock to be removed. In this case, the most promising access direction would be obtained for each such voxel. The delta volume containing the voxels may be divided into slices, with the tool paths being generated for each slice.

The invention also includes a machine readable storage media containing representations of tool paths for the computer aided machining in at least four axis of a workpiece from stock, which tool paths are generated utilizing the method described above.

Finally, the invention includes a computing machine which receives both a surface point representation of the workpiece, which representation contains a unique code for each surface point, and a representation of a tool, the machine utilizing the representations to generate tool paths for the computed aided machining in at least four axis of the workpiece from a stock. The machine includes a machine readable storage media having the workpiece and tool representation stored therein. The machine also includes a means for viewing the workpiece surface from a discrete number of orientations; means for generating a map of surface points visible from each discrete direction; means for utilizing the map to obtain selected most promising access directions, means for performing collision detection for the tool along each most promising access direction, means for adjusting each most promising access direction to eliminate collisions, resulting in a legal direction for each most promising access direction; and means for connection the legal directions into tool paths. The computing machine may also include means for performing collision detection on the tool paths and means for adjusting the tool paths to avoid detected collisions. The means for connection may include an interpolator for both successive legal directions and the orientations of legal directions. The means for performing collision detection may include means for positioning the tool at a most promising access direction obtained by the means for utilizing, and means for performing collision detection between the tool and workpiece for each access direction; while the means for adjusting may include means operative if a collision is detected for computing a correction angle, and means for rotating the tool by the correction angle. The means for utilizing may also include means for forming a visibility "cone" for each segment to be operated on by the tool, and means for utilizing the cone to determine the most promising access direction, such determination being obtained by a means for selectively thinning the visibility cone for preferred embodiments. The means for utilizing may also include a means for generating a voxel visibility map for voxels in the delta volume, the most promising access directions being for such voxels. The delta volume may also be divided into slices, with the means for connecting generating separate tool paths for each slice.

The foregoing and other objects, features and advantages of the invention will be apparent from the following more particular description of preferred embodiments of the invention as illustrated in the accompanying drawings.

IN THE DRAWINGS

FIG. 1 is a schematic block diagram for a method of generating tool paths in accordance with the teachings of this invention.

FIGS. 2a, b, and c are schematic representations illustrating the major steps in the method of FIG. 1.

FIGS. 3a, b, and c are diagrammatic illustrations of surface visibility under various conditions.

FIGS. 4a and b are schematic representations illustrating surface visibility for an alternative part.

Figure 7A:
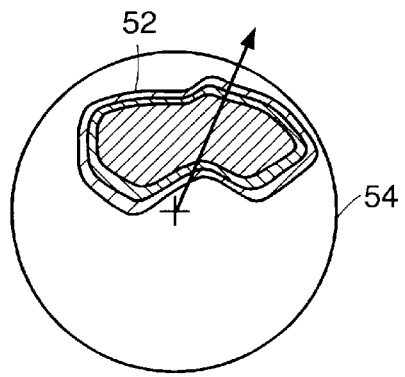

FIGS. 7a and b are diagrams illustrating cone thinning to obtain a most promising access direction in accordance with one embodiment of the invention.

Figure 8A:
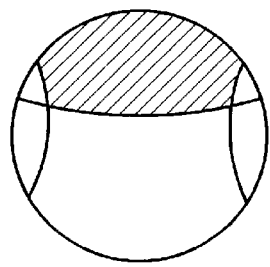

FIGS. 8a and b are diagrams illustration cone thinning taking into account restricted rotations for the tool along at least one axis.

FIGS. 9a–d are diagrams illustrating collision detection and avoidance in accordance with an embodiment of this invention.

Figure 10A:
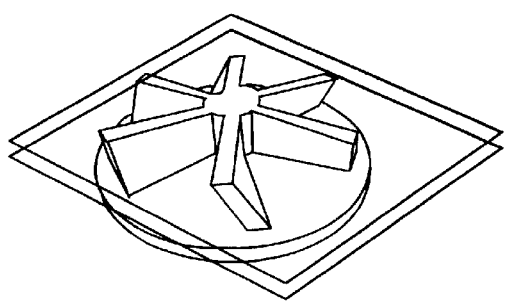
Figure 10B:
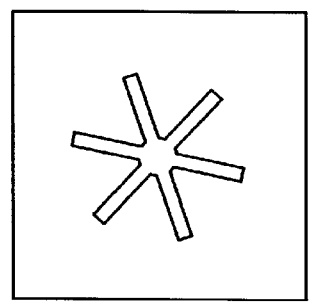
Figure 10C:
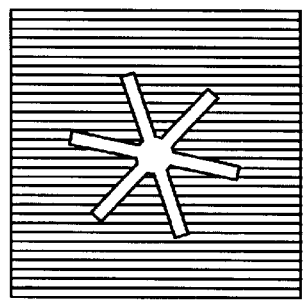
Figure 11F:
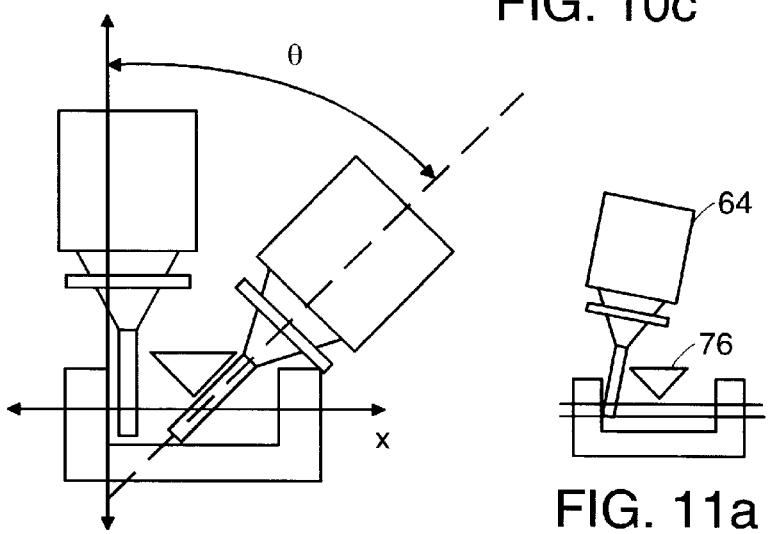
Figures 11A, 11B:
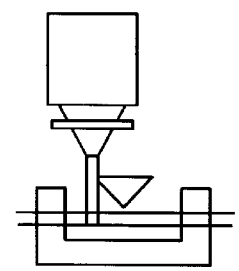
Figure 11C:
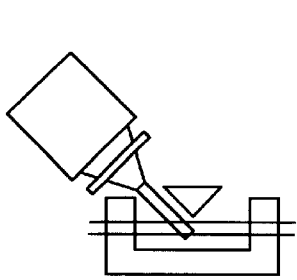
Figure 11D:
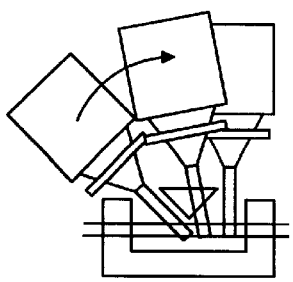
Figure 11E:
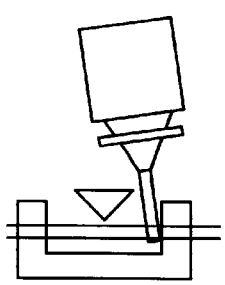
Figure 13A:
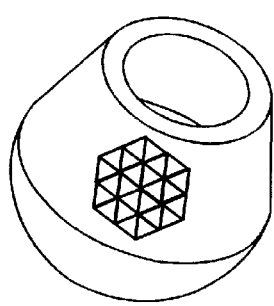
Figure 13B:
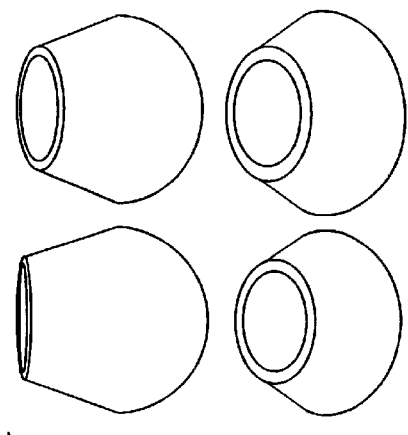
Figure 13C:
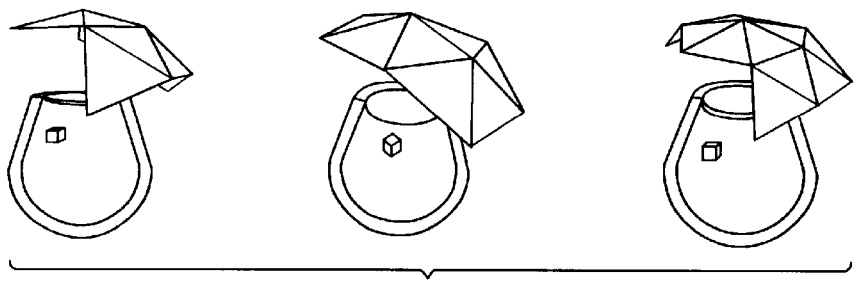
Figure 13D:
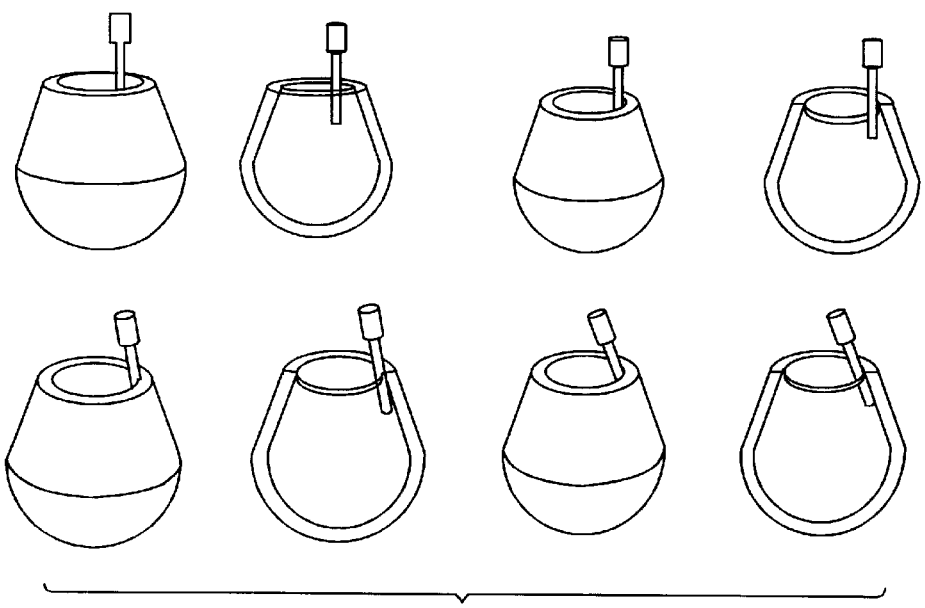
Figure 14A:
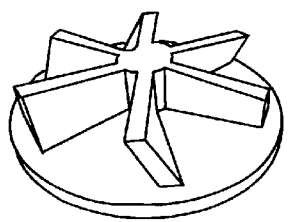
Figure 14B:
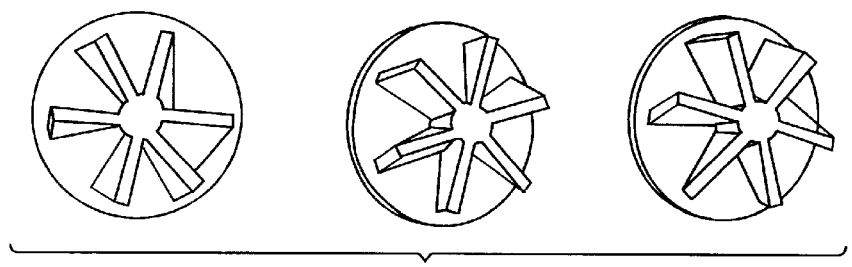
Figure 14C:
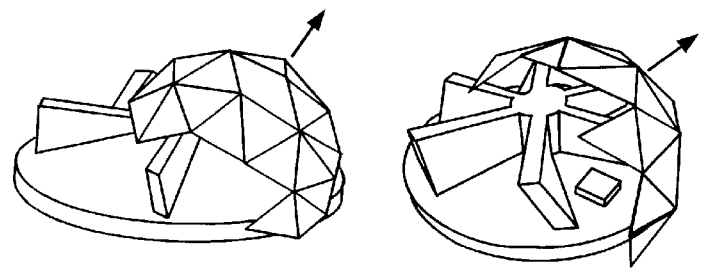
Figure 14D:
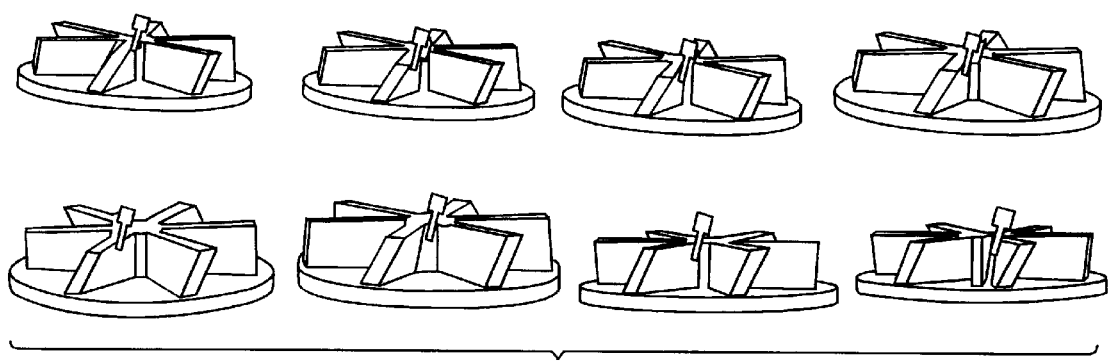

FIGS. 10a–c are diagrams illustrating the slicing of a part for machining and an illustrative tool path for the machining of the part.

FIGS. 11a–f are schematic representation of a tool and part illustrating a problem in generating tool paths and a potential solution.

FIGS. 12a–e are schematic representations of the use of the invention in generating tool paths for a first example which is an undercut channel.

FIGS. 13a–d are schematic representations of a second example showing the use of this invention to produce a vase.

FIGS. 14a–d are schematic representations of a third example showing the use of the invention to produce impeller blades.

DETAILED DESCRIPTION

Figure 1:
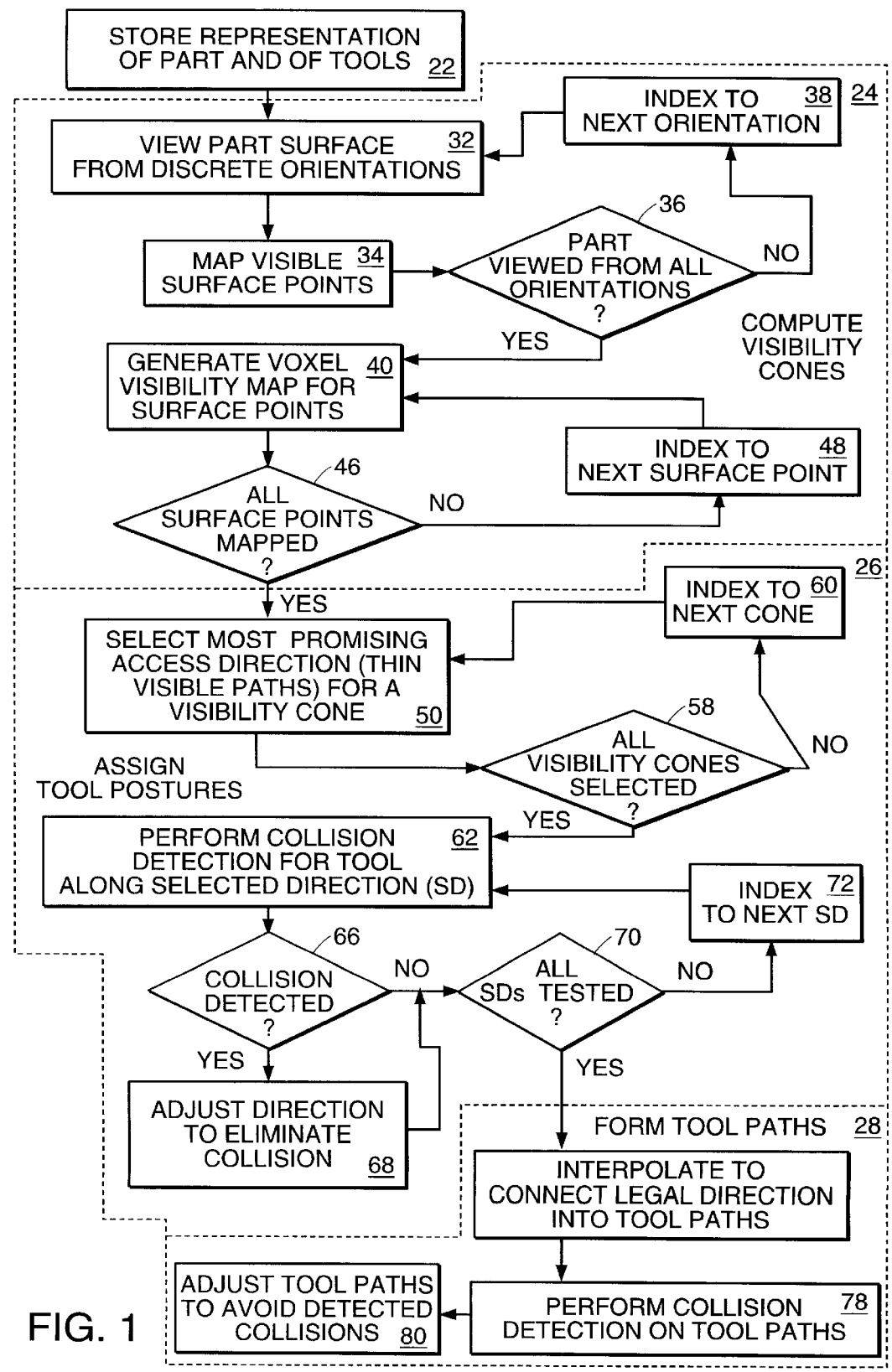

FIG. 1 is a generalize flow diagram of a technique for generating tool paths for a computer aided machining system (CAM system) in accordance with the teachings of this invention. While this technique will be considered for purposes of the following discussions to be implemented, except in one instance, by suitably programing a general purpose computer, for example a Silicon Graphics, Inc. (SGI) Octane workstation, the invention could also be practiced by use of special purpose hardware or by a hybrid system utilizing some combination or hardware and software to perform the various functions. For ease of understanding, the same reference numerals., or variations thereof, are used to refer to common elements in the various figures.

From FIG. 1, it is seen that the first step in the operation, step 22, is to store a representation of the workpiece or part and to store a representation of the tool or tools to be used in a suitable memory device used with the system. The representation of the tool may be in a variety of different forms and may be provided by the tool manufacturer. Examples of suitable representations for the tool include a tesselated representation of the tool as a series of triangulated slabs as shown for example in FIG. 9a, or an implicit equation representation. For preferred embodiments, the representation of the tool is divided into two regions, the active or working surface, for example the cutting surface, and the nonactive surface. The tool representation is preferably exact in size for cutting surfaces, but is an expanded representation for nonactive surfaces to allow, as will be discussed later, a margin for error on collision detection.

The part representation includes a series of encoded points on the surface of the part or workpiece, the number of such points being sufficient to represent the part with a desired resolution. For preferred embodiments, the representation of the part is a tesselated representation with a series of color encoded triangles, each of which triangles has three vertices and three edges, with each edge being shared with an adjacent triangle. For a preferred embodiment, the triangles are color encoded, a 24 bit code permitting 16,777, 216 colors. Eight of the bits may be assigned to each of the primary colors, red, blue and green with, for example, the first eight bits being the value or intensity for red, the next eight bits being the value of green intensity and the last eight bits being the value of blue intensity, each such 24 bit number uniquely identifing a particular triangle on the part surface. However, this representation for the part is not a limitation on the invention, and other representations for points on the part surface, and/or encoding schemes for such points, may be utilized in practicing the teachings of the invention.

Once the representations of the part and tool have been loaded into the system, the system is ready to perform the operations of this invention, which operations are shown in FIGS. 1 and 2 as being grouped into three basic stages. The first stage, stage 24, is to compute visibility cones as illustrated in FIG. 2a; the second stage, stage 26, as illustrated in FIG. 2b, is to assign tool postures; and the third stage, stage 28, as illustrated in FIG. 2c, is to link the tool postures or directions into tool paths. In other words, the invention basically involves determining the various orientations/directions at which each point P on the surface of part 30, which point may be a triangle, is visible, utilizing such "cone of visibility" and other factors to be described to determine a legal access direction for each such point, or for voxels overlying the points, and then linking the legal directions so determined into a tool path or paths.

More specifically, stage 24 includes as a first step, step 32 during which the surface of part 30 is viewed from a discrete orientation. The orientation at which part 30 is viewed will depend on a number of factors, including the surfaces of the part which are to be machined and required or desired resolution. Thus, a part 30 such as that shown in FIG. 3a, where machining is only performed on the top of the part, and not on the sides and bottom of the part, might require viewing the part only over a hemisphere of orientations as shown in FIG. 3b. For a part which is to be machined on more than one side, for example the vase example shown in FIG. 13, the orientations at which the part is viewed would cover a full sphere.

A number of techniques may be employed to assure a substantially uniform distribution of viewing orientations over the part. One such way is to divide the Gaussian Sphere surrounding the part into for example eight patches each corresponding to an octant of the Sphere and covering ⅛ of the surface of the Sphere. Each patch or octant is then subdivided into a number of triangles of equal size, the number of such triangles being determined by desired/required resolution. The centers of the resulting triangular cells represent a fairly homogenous sampling of the sphere, and thus a reasonably homogenous distribution of orientations for viewing the part 30. During step 32 the part is viewed from one such orientation.

During step 34, the next step in the operation, the surface points P, for example the triangles of a part stored as a tesselated representation, which are visible from the orientation used during step 32 are mapped or recorded. One way of performing this function is to use existing three dimensional graphics hardware as a special purpose solid-modeling engine or to accomplish the same function using three dimensional graphics software. The algorithms in either case involve hidden surface removal algorithms known in the art. The algorithm may for example perform hidden surface removal by loading entities of a scene or view into a depth buffer in decreasing depth, pixel values being therefore decided by the closest entity or object and hidden surface being overwritten and effectively removed.

An alternative technique is, as previously discussed, for each point or triangle to be color encoded in for example 24 bits, and then querying the colors that appear on the pixel map to ascertain which points are visible from a give orientation. Using this approach, triangles that are visible are determined in image space, including the color for such triangle and computations are then performed to determine the coding (i.e., color coding) for such point/triangle. The process of determining the code for each point/triangle is the reverse of the process previously described for assigning red/green/blue values to each triangle. In particular, the identity of a triangle is determined from its color obtained from the graphics card/software by concatenating the binary values of the red, green and blue intensities detected into a single 24 bit binary number. This binary number is the identity of the triangle.

Figure 4A:
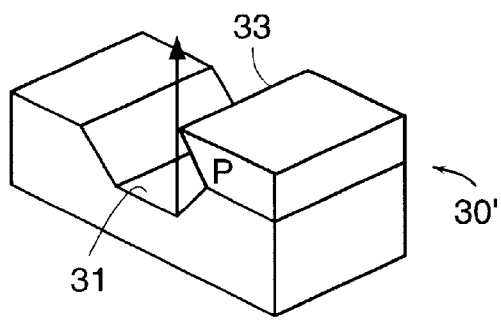
Figure 4B:
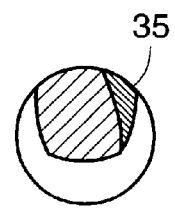
Figure 5:
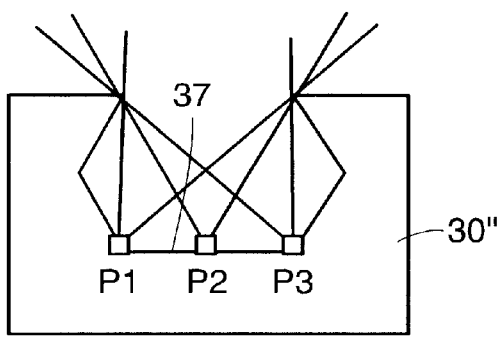
FIG. 5 is a schematic representation of visibility cones at various points along a face or surface for an illustrative part.

FIG. 3b illustrates the visibility map which might be obtained for the shaded surface 31 in FIG. 3a, which map is the upper half of the Gaussian Sphere where the neighbors of this surface 31 are ignored. FIG. 3c illustrates the visibility map for surface 31 of the part 30 when the neighboring sides are taken into account. In FIG. 4a, the part 30' has an overhang 33 over surface 31 which reduces the visibility map as illustrated in FIG. 4b, the lightly shaded area 35 no longer being visible. FIG. 5 illustrates the "visibility cones" for three points, P1, P2 and P3 on a surface 37 of a part 30". This figure illustrates the influence of neighboring faces or surfaces on the visibility cone for various points along a given surface of a complex part. These differences in visibility cone are automatically accounted for by the teachings of this invention.

Once the points visible from a given orientation have been mapped during step 34, the operation proceeds to step 36 to determine if the part has been viewed from all of the orientations selected in the manner previously indicated. If the part has not been viewed from all selected orientations, the operation proceeds to step 38 to index to the next orientation and the operation then returns to step 32 to view the part surface from the new discrete orientation. Surface points visible from this new orientation are then mapped during step 34 and the operation returns to step 36 to again determine if all orientation have been used. This sequence of operations is repeated until, during the performance of step 36, a "yes" output is obtained.

Figure 6:
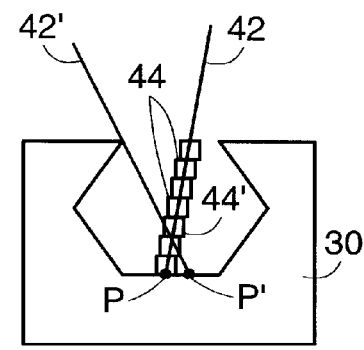
FIG. 6 is a schematic representation of voxel visibility along a single visible direction for a surface point P.

A "yes" output during step 36 causes the operation to proceed to step 40, during which a voxel visibility map for surface points is generated. Up to this point, only the visibility of points on the surface of part or workpiece 30 has been considered. However, to generate tool paths within the volume to be removed (the "delta volume") from the initial billet of raw material (sometimes also referred to herein as the "stock") in order to obtain the "embedded design," which is the shape or part to be machined, accessability information on the delta volume is necessary. Voxel visibility refers to accessability information for the entire delta volume which is required in order to prevent interference.

in order to map delta volume visibility in three dimensional space, it is necessary to digitize or sample this space. For a preferred embodiment of the invention, a simple three dimensional space enumeration of the delta volume is achieved by converting representations in this space to voxels using a simple scan conversion algorithm (see for example Foley, J. et al, *Computer Graphics: Principles in Practice*, Addison-Wessley, 1995; or Sammet, H., *The Design and Analysis of Spacial Data-Structures*, Addison-Wessley, 1991). More particularly, volume visibility is computed by extending the surface visibility information obtained during earlier steps. From this earlier visibility analysis, each point on the surface of workpiece 30 has a set of orientations along which it is visible (i.e., the cone of visibility). Rays are cast from point P along each of these orientations and all voxels touched by these rays are tagged. Referring for example to FIG. 6, the ray or directional line 42 extending from point P passes through a set of voxels 44. A voxel 44 may be passed through by more than one directional line or ray from a given point P and may be passed through by rays from a number of different points P. For example, voxel 44' is passed through by both ray 42 from point P and ray 42' from point P'. By taking advantage of coherence along a line, volume visibility can be computed in the manner indicated above during step 40 with minimal computational effort. The data generated on voxel visibility during step 40 is an N-dimensional array where N is the number of axis for the CAM system, with an N-tuple index (i.e., x, y, z, $\theta$, $\phi$ for a five dimensional array). Since a voxel visibility map has a large amount of data, storing this map is expensive and memory limitations normally require that only a course voxel grid be used, for example 0.5 cm per side. Various hierarchal data structures for storing this data may permit the utilization of higher resolution voxel grids.

Once the voxel visibility map has been generated for a particular surface point P, the operations proceeds to step 46 to determine if voxel visibility mapping has been performed for all surface points P. If a "no" output is obtained during step 46, the operation proceeds to step 48 to index to the next surface point, and then returns to step 40 to generate a voxel visibility map for the new surface point. Steps 40, 46 and 48 are repeated for each surface point until, during step 46, a determination is made that all surface points P have been mapped.

When a "yes" output is obtained during step 46, the Compute Visibility Cones stage 24 is completed, with visibility cones having been determined both for each surface point P and for each voxel 44. The operation can thus proceed to step 50 which is the first step of Assign Tool Posture stage 26. While during stage 24 a set of cones of visibility for regions of the delta volume were generated, visibility does not insure accessability. Therefore, during stage 26, guaranteed legal access directions or postures are determined from which a tool can access a given region/voxel of the delta volume without collision. As will now be discussed, this stage involves the performance of two operations which are (a) to determine a most promising direction for a tool for each visibility cone (i.e., for each voxel 44 of the delta volume for a roughing operation and for each point P on the surface of part 30 for a finishing operation), and (b) to then do collision detection and avoidance to obtain legal directions that are guaranteed to be collision-free.

Figure 7B:
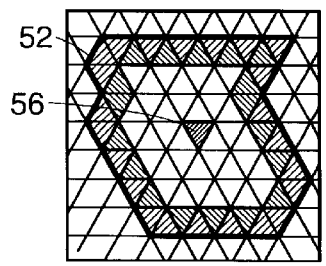

During step 50, a most promising access direction is selected for each visibility cone, this selection being done by thinning visibility paths for a preferred embodiment. At this point it should be mentioned that while the term "visibility cone" has been used above and will be used hereinafter to refer to the visibility region (i.e., all of the visible orientations for a given voxel 44 or point P), the visible orientations for a given voxel/point generally do not have a regular (cone shape and may in fact have a somewhat irregular shape as illustrated in FIGS. 7a and 7a. In performing step 50 to determine a most promising access direction, while a number of strategies may be utilized, the strategy found most useful for purposes of the current invention is to use the direction or orientation which is the skeleton 56 of the visibility patch 52 on the Gaussian Sphere 54 previously discussed. For a preferred embodiment, this skeleton 56 is obtained by thinning the tesselated representation of the visibility cone on the Gaussian Sphere. This thinning is similar to that used in computer vision applications, using triangular rather than square cells. The algorithm consists of iterative thinning steps, with a stop condition. More specifically, starting from the original visibility cone, the outer boundary is shrunk inwards iteratively one layer at a time, a layer being defined as all the triangles that contact the boundary. After each shrinking step, as illustrated for example in FIG. 7b, the thinning boundary is redefined and the process repeated. The process is stopped when the next step would reduce the shrinking region to an empty set. One way to achieve this is to continue the iteration until the shrinking region goes to an empty set and then back up one step. The entity that remains at this point is the skeleton center 56.

Figure 8B:
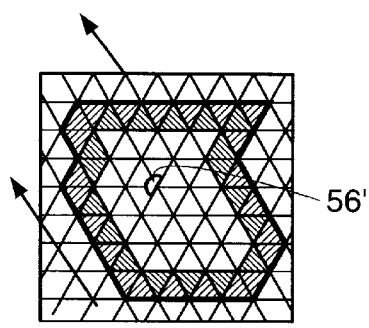

The above assumes that rotations in both the $\theta$ and $\phi$ axis for the machines being utilized are a fill 180 degrees. However, most five axis machines have smaller angular limitations. For example, trunnion tables may have a 110 degree limit in at least one axis of rotation and most rotating heads have a limit of about 70 degrees in order to maintain proper operating contact with the surface being worked on. These limits must be considered during machining and, in particular, during the thinning operation just described. Referring to FIG. 8, a restricted thinning operation is therefore performed to take into account the indicated machine orientation limit. While the steps in restricted thinning are identical to those described above, the stop condition is different in that, instead of stopping just before the shrinking region vanishes, stopping occurs just before the intersection of the shrinking region with the secondary contour region vanishes. This results in a skeleton 56'. In other words, thinning stops when the next thinning step would leave no triangles in the contour region 57. If more than one triangle is left, some measure is taken of a center, for example a center of mass, and the triangle or triangles in which this lies is the skeletal center.

Once step 50 has been completed for a visibility cone (of a voxel or point, as appropriate), the operation proceeds to step 58 to determine if a most promising access direction has been selected for all visibility cones. If there is a "no" output during step 58, the operation proceeds to step 60 to index to the next appropriate visibility cone and then returns to step 50 to select the most promising access direction for the new visibility cone. Steps 50, 58, and 60 are repeated until a most promising access direction has been selected for all of appropriate visibility cones.

Figure 9A:
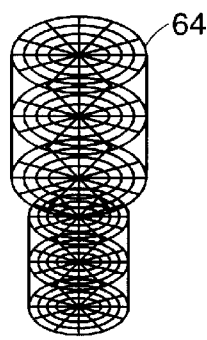
Figure 9C:
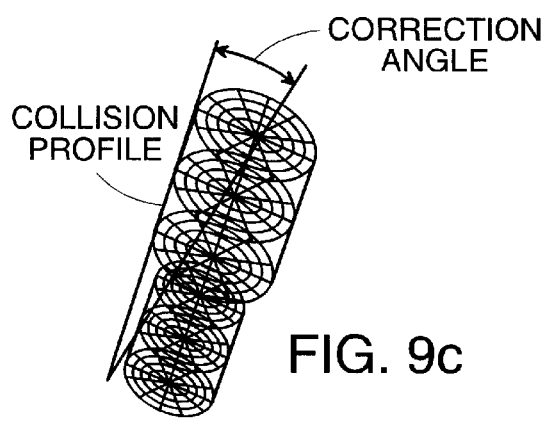
Figure 9B:
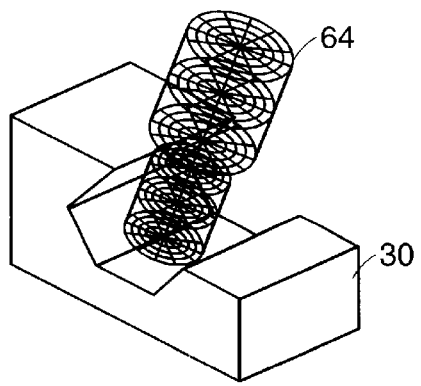
Figure 9D:
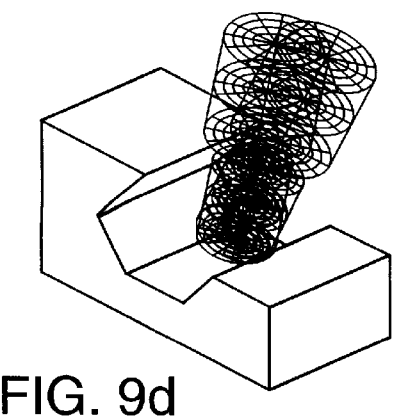

When a "yes" output is obtained during step 58, the operation advances to step 62 to perform collision detection for a selected tool along a selected most promising access direction. This first essential step in converting visibility to accessibility may be preformed in a variety of ways, most of which are known in the art. In particular, examples of such approach include Rapid (Gottschalk, S., Lin, M. and Manocha, D. OBB Tree: *A hierarchical structure for rapid interference detection*, SIGGRAPH'96 Visual Proceedings; New Orleans, L.A., U.S.A., Aug. 4–9, 1996.) and those based on the K-DOP approach (Held, M., J. T. Klosowski, J. S. B. Mitchell, H. Sowizral, K. Zikan (1996): *Real-Time Collision Detection for Motion Simulation within Complex Environments*, SIGGRAPH'96 Visual Proceedings; New Orleans, L.A., U.S.A., Aug. 4–9, 1996 and Klosowski, J. T., M. Held, J. S. B. Mitchell, H. Sowizral, K. Zikan (1997): *Efficient Collision Detection Using Bounding Volume Hierarchies of K-DOPs*, IEEE Transactions on Visualization and Computer Graphics, March 1998, Volume 4, Number 1.), both of which are capable of detecting collisions between complex objects within a few milliseconds. A similar approach in accordance with the teachings of this invention, illustrated in FIGS. 9a–d, is based on an analysis of the penetration of the workpiece or part 30 by tool 64 and involves the following steps:

a. As shown in FIG. 9a, the tool 64 is represented as a series of triangulated slabs, these slabs preferably being somewhat wider than the actual tool in non-cutting/ operating areas to facilitate assured collision avoidance.

b. Position the tool at the orientation of a most promising access direction as determined during step 50, this step being shown in FIG. 9b.

c. Perform a collision detection check between the tool and the workpiece using for example one of the algorithms indicated above (FIG. 9c and step 66).

d. If a collision occurs, find the amount of penetration, compute the correction angle and rotate the tool by the correction angle (step 68 and FIG. 9d).

e. Repeat step (c) to assure that no collision is occurring. This step is required because the rotation of the tool during step (d) may result in the tool colliding with a surface of the part other than the surface for the original collision. Steps (c), (d) and (e) are repeated for a selected number of iterations, for example three iterations for an illustrative embodiment.

f. If the algorithm exits without converging, the iteration limit of step (e) having been reached, then the voxel/ point along the orientation being tested is marked as being inaccessible from this orientation with the given tool 64. If this occurs for some selected voxels of the delta volume, collision detection may be performed, either for the entire delta volume or at least for the selected voxels, with a no different tool 64, for example, a tool which is longer and/or thinner. This iteration of steps 62, 66 and 68 with a different tool may be performed one or more times, either automatically by the computer system or with manual intervention, in an effort to find legal access directions for all voxels/ points.

Referring again to FIG. 1, when collision detection and correction has been completed for a given direction, the operation proceeds to step 70 to determine if all directions have been tested and through step 72 to return to step 62 to perform collision detection for the next most promising access direction.

While in the discussion above, tool 64 has been represented as a series of triangulated slabs, it is also possible to represent the tool solid by means of an implicit equation, implicit equations in three-dimensional space being defined as a function of x, y and z equal to a constant, which is usually zero (i.e., f (x, y, z)=0). An additional useful feature of implicit equations is that, like solids, they divide space into two subsets, a set where f (x, y, z)>0 in a set where f (x, y, z)<0. This division naturally corresponds to the interior and exterior of the solid. Therefore, determining whether a given coordinate (x, y, z) is within the solid is as simple as evaluating the function f (x, y, z). Boundary points are those for which f (x, y, z)=0.

The tesselated or triangular representation of the part is also converted to a point cloud representation for use in interpenetration or collision analysis. A point cloud representation ignores triangle faces and edges and is formed of the triangle vertices. With this model, contact is considered to occur when the point cloud for a triangle penetrates the tool solid as represented by the implicit equation. Such contact may occur at any point along the tool, and may be used for the detection and correction of undesired collisions as well as for detection of collision of the tool with the desired triangle. This technique is thus an alternative technique for performing collision detection during step 62 or other steps in the method where collision detection is required.

When, to the extent possible, collision detection and correction have been performed on each of the most promising access directions, so there is now a legal access direction for each voxel/point, Assign Tool Postures stage 26 is completed and the operation proceeds to step 74, the first step of the Form Tool Path stage 28. As indicated previously, during stage 28, the legal access directions determined during stage 26 are converted or formed into tool paths for the (CAM machine and tool being utilized.

The first step in this operation, step 74, is to interpolate to connect the legal directions for the points into tool paths. Interpolation to convert from legal directions to tool paths is performed both between adjacent legal directions and between the orientations for such adjacent legal directions. Interpolation between adjacent legal directions can be performed in straight forward fashion using for example linear or spline interpolation. Interpolation between the orientations for such legal directions can be performed by interpolating quarternions using quaternion algebra for an illustrative embodiment, linear quaternion interpolation of orientation being utilized for a cutting tool. Further, while specific techniques for performing interpolation at two levels has been indicated above, these interpretation techniques are not limitations on the invention and other interpolation techniques known in the art might be utilized in suitable applications in performing step 74.

Further, while it is possible to machine a part in a single operation, the delta volume of a part is generally decomposed into slices perpendicular to the set up direction as illustrated in FIGS. 10a–c, with the generated tool paths being a zig-zag or Voronoi pattern so that the paths fill the delta volume of the slice as shown in FIG. 10c. Each slice corresponds to an appropriate cut depth for the tool being utilized, which depth may correspond to the depth of a fraction of a voxel, the full voxel, or some number of voxels, depending on slice thickness and voxel resolution. Where the cut is a fraction of a voxel thickness or has a thickness of one voxel, the orientation direction for a cut for such voxel is the legal direction determined for such voxel during steps 62–68. Where more than one voxel thickness is involved for the slice, interpolation is performed on the legal directions for the voxels at a point along the slice to obtain the orientation for the tool path at that point. This voxel interpolation would generally not arise for a finishing operation where the legal direction for the point/triangle would be the orientation used by the tool path for that point.

While the legal postures computed from stages 24 and 26 form a promising basis from which tool paths can be interpolated, it does not assure that the interpolated path will itself be completely legal. An example of this is shown in FIG. 11 where the tool moving along a tool path from left to right at a give slice level is unable to advance from the position shown in FIG. 11c to for example the position shown in FIG. 11d because the overhang 76 in the middle of the opening divides the delta volume space into two portions, one which can be accessed from the left, and one which can be accessed from the right.

To prevent problems such as that shown in FIG. 11, a collision avoidance algorithm such as one of the algorithms previously described in conjunction with steps 62–68 is performed to provide rapid verification and correction of legal paths during the interpolative stage of path generation (step 78 for collision detection and step 80 for collision avoidance). To perform these steps, the interpolated tool path is broken up into a finely-spaced series of interpolated postures. The resolution of this sampling is limited only by the processing speed of the computer system used and the time available for verification. For example, on an SGI Octane workstation computer with a double 250 MHz R10,000 card, a 10 cm path can be verified at an 0.5 mm spacing in about one second. At each sample point, collision is checked for in the manner previously described. If a collision is detected, a correction angle is computed and the tool is rotated by that amount. If collision cannot be avoided after a certain number of iterations, for example, three iterations, as would for example be the case for the part shown in FIG. 11, the sample point is deemed to be impenetrable and, with a zig-zag pattern, the tool pattern is reversed from the previous sample point. Thus, referring again to FIG. 11, a zig-zag pattern would be performed on the left side with postures such as those shown in FIGS. 11a, b, and c. The tool would then be moved to the right side and a zig-zag tool pattern for this side also computed. In this way, tool paths can be computed for irregularly shaped parts quickly and inexpensively with little if any human intervention required, either from the design engineer or from the machine operator. Similar problems with a zig-zag pattern would also arise for the part of FIG. 10. In either case, a pattern other than zig-zag might also be utilized to reduce discontinuities.

FIGS. 12, 13 and 14 illustrate various steps in the method previously described for three illustrative parts, also showing execution times for the various steps as performed on an SGI Octane workstation with two 250 MHz R10,000 processors. The times shown are real time elapsed as opposed to CPU time. These examples illustrate how the invention may be practiced to produce tool paths for a variety of complex workpiece shapes. In each case, the workpiece is formed from an initial substantially rectangular billet or stock.

While in the discussion above, it has generally been assumed that the machine is being used to rough a part, generally with a single tool, this is not a limitation on the invention. In particular, since representations for a variety of tools may be stored in the computer system, the appropriate tool for finishing part 30 at each region along its surface may be accessed and utilized for generating appropriate tool paths in such surface region of the part.

While the invention has been described above with referenced to preferred implementations for generating tool paths, and variations thereon, the invention also includes the CAM tool paths generated employing the teachings of the invention which may be stored in machine readable form in the RAM or other suitable memory of a computer system or may be downloaded and stored on a magnetic or optical disc or other suitable machine readable storage medium. Further, the various embodiments disclosed are primarily for purposes of illustration in connection with the inventive methodology and both the variations discussed above and others, either already developed or to be developed in the future, may be employed in practicing the teachings of the invention. Thus, while the invention has been particularly shown and described above with reference to preferred embodiments, the foregoing and other changes in form and detail may be made therein by one skilled in the art without departing from the spirit and scope of the invention which is to be defined only by the appended claims.

What is claimed:

1. A method for utilizing a computer system to generate tool paths for the computer aided machining in at least four-axis of a selected workpiece from a stock including:
   (a.) store in the computer system both a surface point representation of the workpiece, which representation contains a unique code for each said surface point, and a representation of a tool for which paths are to be generated;
   (b.) view the workpiece surface from a discrete number of orientations and generate a map of surface points visible from each said discrete orientations;
   (c.) utilize said maps to obtain selected most promising access directions;
   (d.) perform collision detection for said tool along each said most promising access direction and adjust each said access direction to eliminate collisions, the results of this step being a legal direction for each said most promising access direction; and
   (e.) connect said legal directions into tool paths.

2. A method as claimed in claim 1 including the step, of performing collision detection on said tool paths and adjusting said tool paths to avoid detected collision.

3. A method as claimed in claim 1 wherein step (e) is performed by interpolating both between successive legal directions and the orientations of the legal directions.

4. A method as claimed in claim 1 wherein said surface segmented representation of the workpiece is a tessellated representation with each point being a triangular segment.

5. A method as claimed in claim 4 wherein said tool is represent as a series of triangulated slabs.

6. A method as claimed in claim 4 wherein step (d) includes:
   f. positioning said tool at a most promising access direction determined during step (c);
   g. perform collision detection between the tool and workpiece for each said access direction;
   h. if a collision is detected, compute a correction angle; and
   i. rotate the tool by the correction angle.

7. A method as claimed in claim 6 wherein step (d) includes:
   j. repeating step (g) and, if a collision is detected, repeating steps (h), (i) and (j) until either a collision in not detected during step (g) or a selected number of iterations of steps (h, i, j) have been performed.

8. A method as claimed in claim 4 wherein said tool is represented as an implicit equation.

9. A method as claimed in claim 4 wherein the representation of said tool used during step (d) for collision detection is wider than said tool at least in non-working areas.

10. A method as claimed in claim 4 wherein the code assigned to each segment is a color code, and wherein the map generated during step (b) is a color map.

11. A method as claimed in claim 1 wherein the step (c) includes forming visibility cone for each segment to be operated on by said tool, and utilizing said cone to determine said most promising access direction.

12. A method as claimed in claim 11 wherein the utilizing said cone step involves selectively thinning said visibility cone.

13. A method as claimed in claim 12 wherein there are angular limits on at least one of said axis and wherein the thinning step is restricted so that each most promising access direction is within the angular limits of said at least one axis.

14. A method as claimed in claim 12 wherein said selective thinning is performed by removing outer visibility paths of said cone.

15. A method as claimed in claim 11 wherein each said segment is a voxel in delta volume to be removed from said stock to form said workpiece.

16. A method as claimed in claim 11 wherein each said segment is a said surface point.

17. A method as claimed in claim 1 including the step performed after step (b) of generate a voxel visibility map for each surface point which includes voxels in a delta volume of said stock to be removed along visible paths to said point, said most promising access direction during step (c) being obtained for each said voxel.

18. A method as claimed in claim 17 wherein said delta volume is divided into slices, and wherein step (e) is performed to generate separate tool paths for each said slice.

19. A machine readable storage media containing representations of tool paths for the computer aided machining in at least four axis of a workpiece from stock, which tool paths are generated utilizing the method of claim 1.

20. A computing machine which receives both a surface point representation of the workpiece, which representation contains a unique code for each said surface point, and a representation of a tool, said machine utilizing said representations to generate tool paths for the computer aided machining in at least four axes of the workpiece from a stock, including:

a machine readable storage media having said representation stored therein;

means for viewing the workpiece surface from a discrete number of orientations;

means for generating a map of surface points visible from each said discrete direction;

means for utilizing said map to obtain selected most promising access directions;

means for performing collision detection for said tool along each said most promising access directions;

means for adjusting each said most promising access direction to eliminate collisions, resulting in a legal direction for each said most promising access direction; and means for connecting said legal directions into tool paths.

21. A computing machine as claimed in claim 20 including:

means for performing collision detection on said tool paths; and means for adjusting said tool paths to avoid detected collisions.

22. A computing machine as claimed in claim 20 wherein said means for connecting includes an interpolator for both successive legal directions and the orientations of legal directions.

23. A computing machine as claimed in claim 20 wherein said means for performing collision detection includes means for positioning said tool at a most promising access direction obtained by said means for utilizing, and means for performing collision detection between the tool and workpiece for each said access direction; and wherein said means for adjusting includes means operative if a collision is detected for computing a correction angle, and means for rotating the tool by the correction angle.

24. A comprising machine as claimed in claim 20 wherein said means for utilizing includes means for forming a visibility cone for each segment to be operated on by said tool, and means for utilizing said cone to determine said most promising access direction.

25. A computing machine as claimed in claim 24 wherein said means for utilizing said cone includes means for selectively thinning said visibility cone.

26. A computing machine as claimed in claim 20 wherein said means for utilizing includes means for generating a voxel visibility map for voxels in a delta volume, said most promising access direction being for said voxels.

27. A computing machine as claimed in claim 26 wherein said delta volume is divided into slices, and wherein said means for connecting generates separate tool paths for each slice.

* * * * *